United States Patent
Maggiore

(10) Patent No.: US 9,730,004 B2
(45) Date of Patent: Aug. 8, 2017

(54) SYSTEM, NETWORK AND METHOD FOR SECURING CONTACTLESS COMMUNICATIONS

(71) Applicant: Sartorius Stedim Biotech GmbH, Goettingen (DE)

(72) Inventor: Frank Maggiore, Port Jefferson, NY (US)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 0 days.

(21) Appl. No.: 14/870,363

(22) Filed: Sep. 30, 2015

(65) Prior Publication Data

US 2017/0094446 A1   Mar. 30, 2017

(51) Int. Cl.
 *H04W 4/00* (2009.01)
 *H04W 12/06* (2009.01)
 *H04W 84/20* (2009.01)

(52) U.S. Cl.
 CPC ........... *H04W 4/008* (2013.01); *H04W 12/06* (2013.01); *H04W 84/20* (2013.01)

(58) Field of Classification Search
 CPC .................. H04B 3/36; H04B 10/2575; H04B 10/25752; H04B 10/2918; H04B 10/502; H04B 10/503; H04W 12/08
 USPC ...................... 340/540, 686.1, 687
 See application file for complete search history.

(56) References Cited

U.S. PATENT DOCUMENTS

| | | | | |
|---|---|---|---|---|
| 7,612,662 B2* | 11/2009 | Niemiec | ............... | A61B 5/0002 340/539.12 |
| 7,733,224 B2* | 6/2010 | Tran | .................... | G06F 19/3418 340/3.1 |
| 2011/0008527 A1* | 1/2011 | Teggatz | ............. | B23K 26/0084 427/2.23 |
| 2012/0274474 A1* | 11/2012 | Zhou | ..................... | G06F 13/385 340/687 |
| 2013/0049976 A1* | 2/2013 | Maggiore | ............. | G06T 19/006 340/686.1 |
| 2013/0278635 A1* | 10/2013 | Maggiore | ............. | G06T 19/006 345/633 |
| 2015/0358357 A1* | 12/2015 | Diaz-Tellez | ........ | G06F 21/6209 726/27 |

* cited by examiner

*Primary Examiner* — Ping Hsieh
(74) *Attorney, Agent, or Firm* — Gerald E. Hespos; Michael J. Porco; Matthew T. Hespos

(57) ABSTRACT

A system for securing contactless communications with an external device is provided. The system has an operating device for performing at least one of production and testing operations. A controlling device is coupled operationally to the operating device; a receiving device configured to receive first data from the external device. A unidirectional network is configured to allow communication of the first data from the receiving device to the controlling device. The controlling device is configured to control the at least one of production and testing operations performed by the operating device on the basis of the first data.

18 Claims, 11 Drawing Sheets

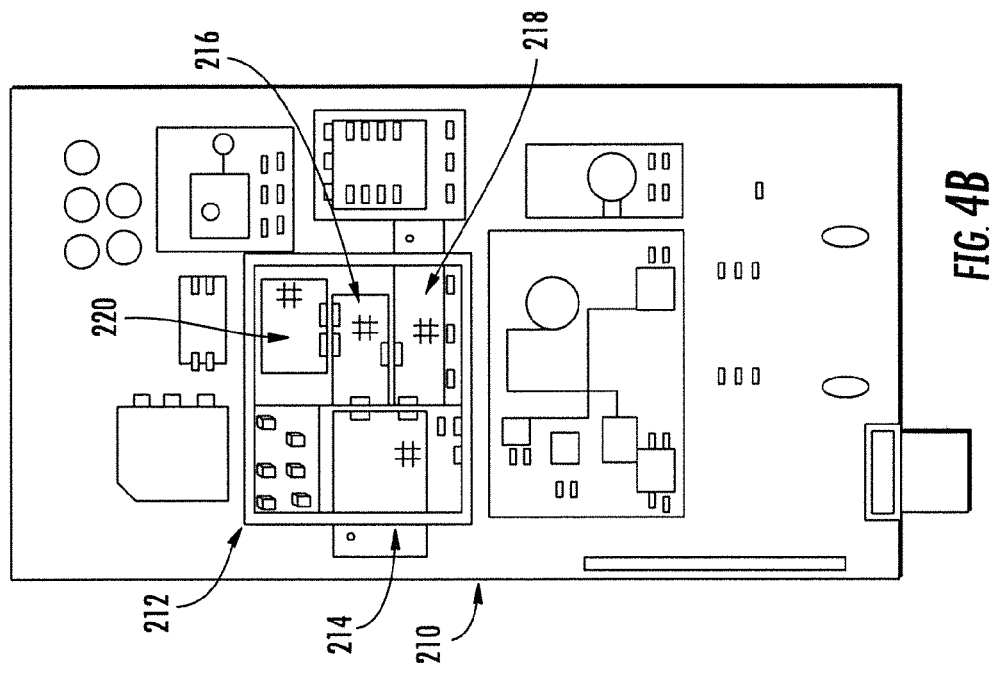
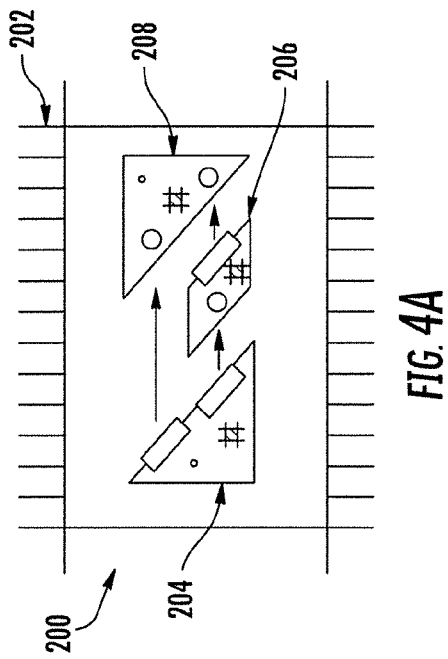
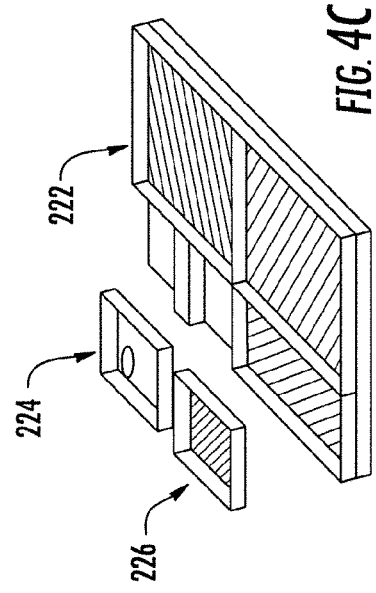

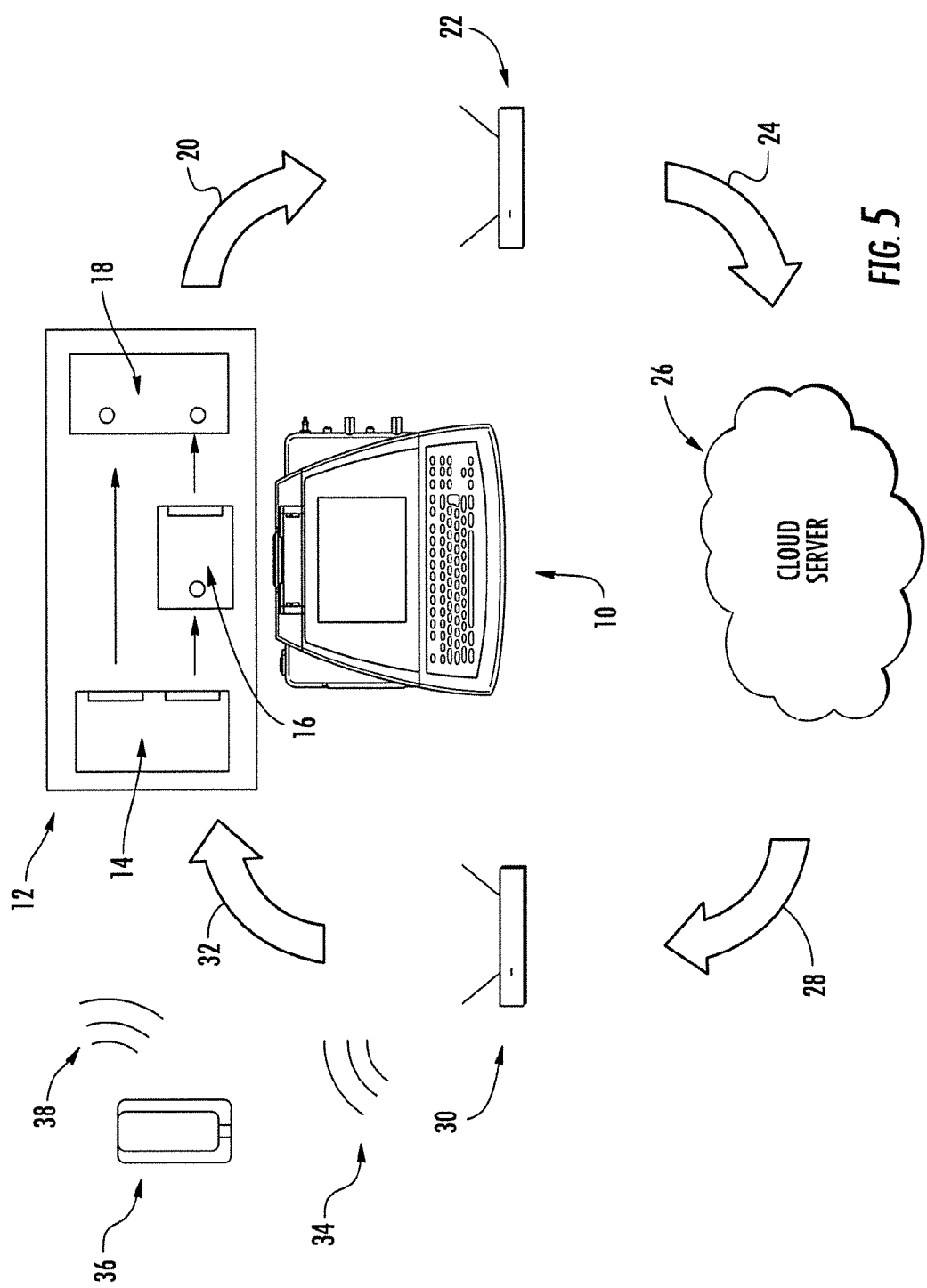

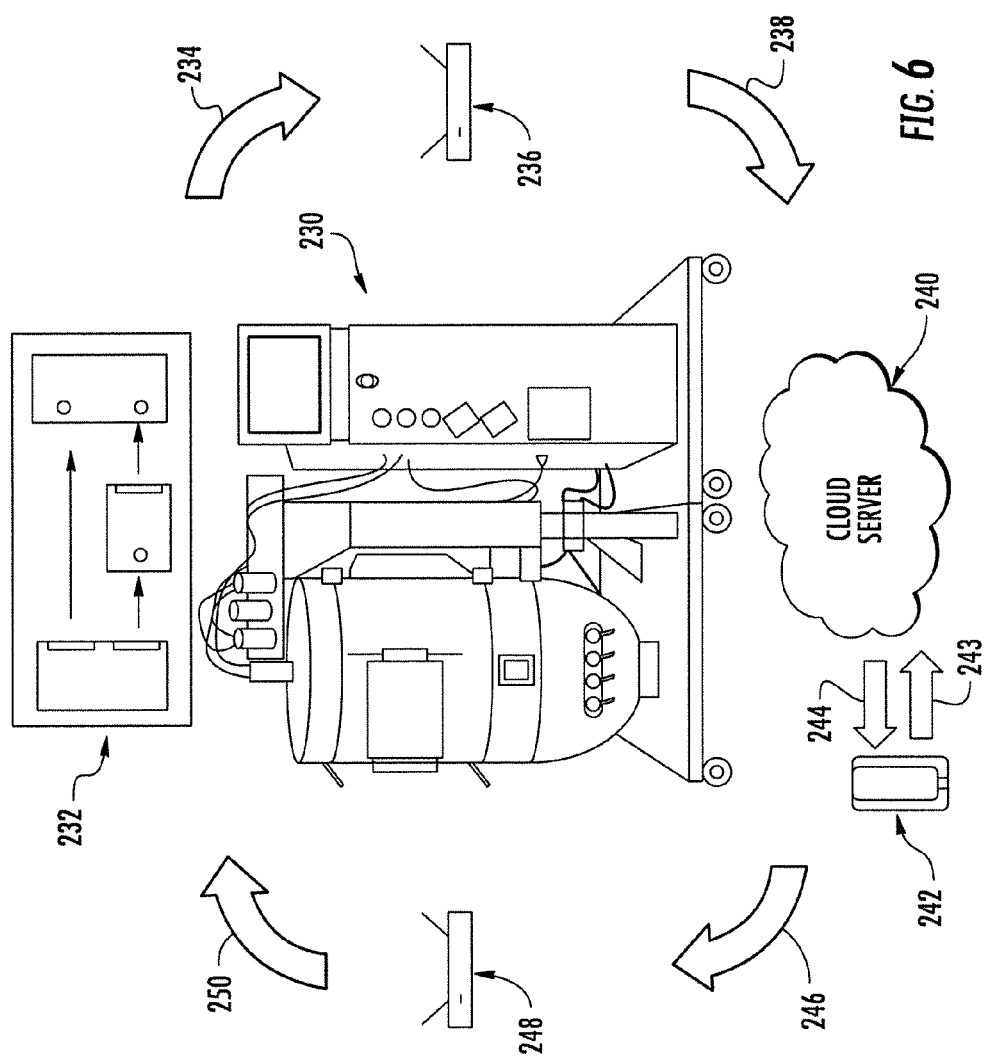

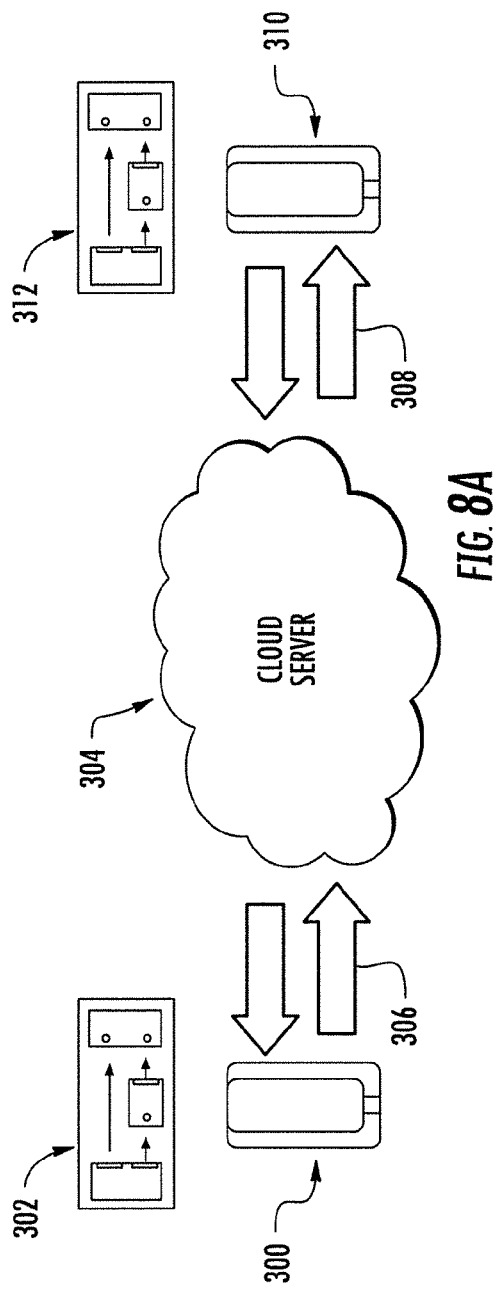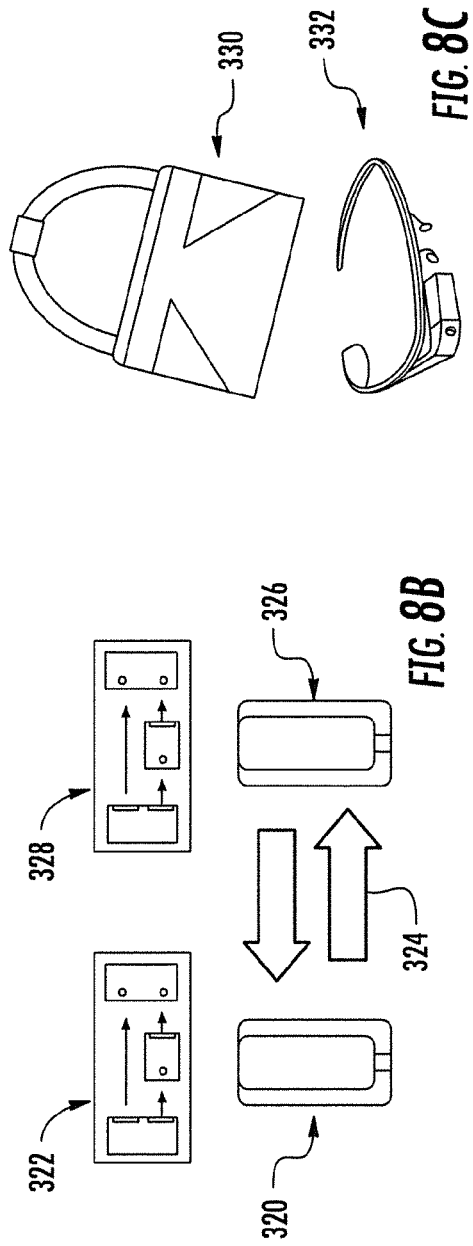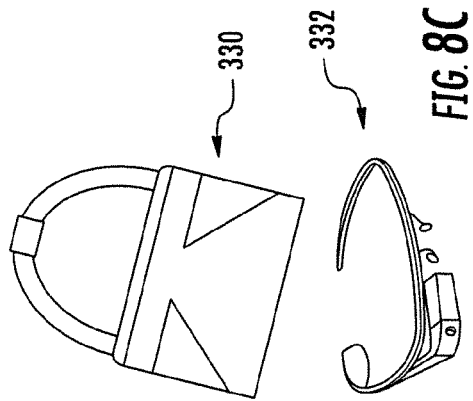

FILLABLE FORM FIELDS

| FILLABLE FORM FIELDS | | |
|---|---|---|
| STANDARD TEST: | YES ▸ | |
| Min. BP: | | psi |
| Max. BP: | | psi |
| TEST CLASS: | STANDARD ▸ | |
| NET VOLUME: | MEASURING ▸ | |
| VOLUME: | 0 | ml |
| COMPANY: | | |
| BUILDING: | | |
| DEPARTMENT: | | |
| PRODUCT LOC: | | |
| PRODUCT: | | |
| PRODUCT LOT: | | |
| FILTER: | | |
| FILTER LOT: | | |

CODE TO TRANSMIT FOR FILLABLE FIELDS

Start Test; Program #43
<a1> Yes; <b1> 46.00; <b2> 65.00; <b3> Standard; <b4> Measuring; <b5> X; <c1> Sartorius; <c2> X; <c3> X; <c4> X; <c5> X; <c6> X; <s1> 5441307H1--SS; <s2> 234003813unit#012

VISUAL QR MARKER OF CODE

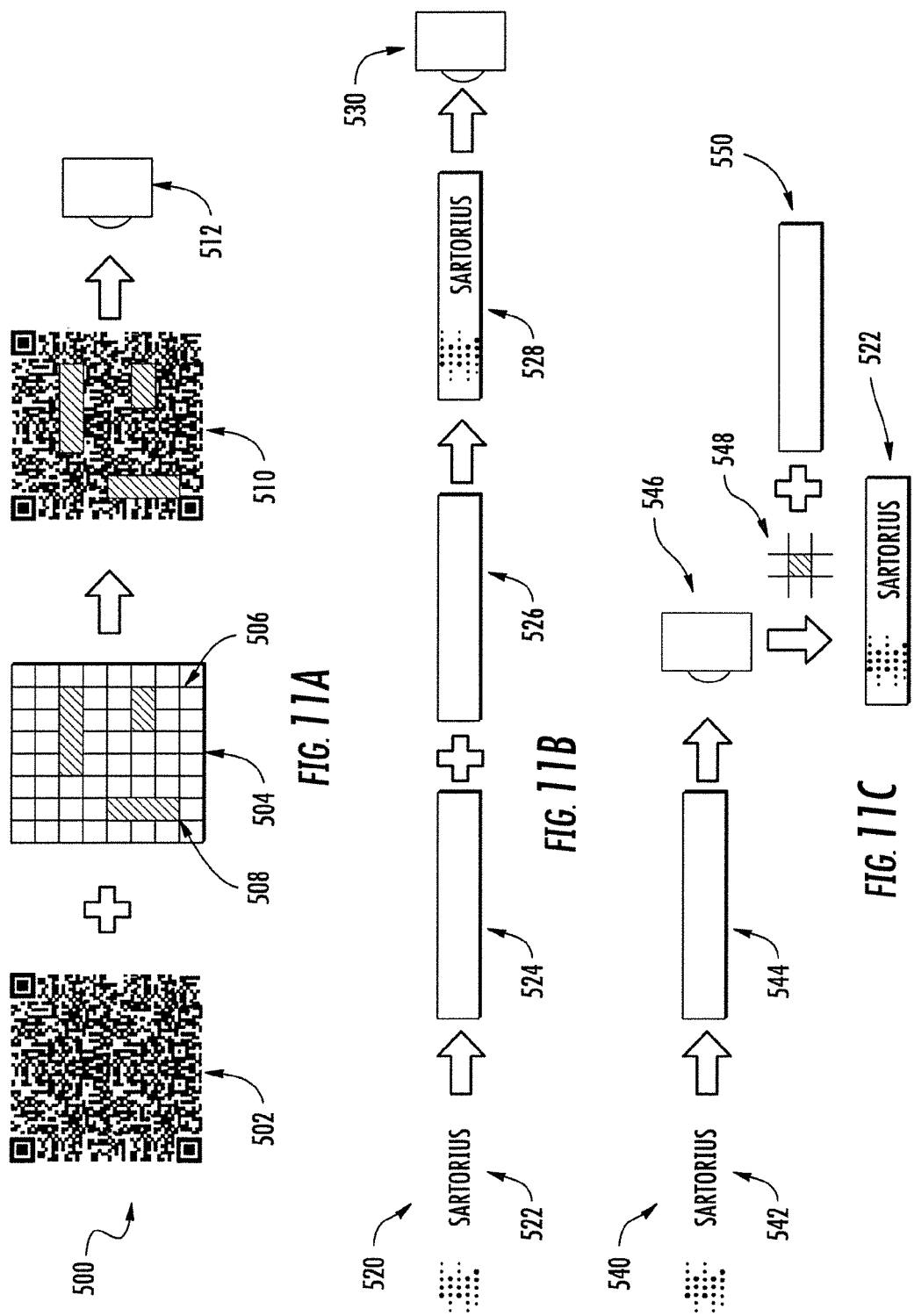

SYSTEM, NETWORK AND METHOD FOR SECURING CONTACTLESS COMMUNICATIONS

BACKGROUND

1. Field of the Invention

The present invention relates to the use of contactless communication technologies to allow for the secure communication of data, such as instructions, to an operating device that performs production and/or testing operations.

2. Description of the Related Art

Although wireless devices are used ubiquitously to receive data from and issue commands to control various consumer electronics, their use with industrial operating devices, particularly those employed in the manufacture of pharmaceutical and biopharmaceutical products, has been limited due to legal requirements and the risk that the data could be tampered with. Indeed, utilizing a wireless device and/or an open network architecture increases the likelihood that the data may be manipulated from an external source and that the operating device may be infected by a computer virus, Trojan, worm, or other malicious code. This manipulation of operating devices could potentially have adverse effects for industrially-manufactured products, particularly for drug products manufactured with industrial equipment, and lead to grave repercussions on public health and safety.

Methods such as encryption and password protection have been used to try and improve the security of the industrial operations. However these methods have drawbacks, such as the need for significant computational power in encryption and the relative ease with which passwords may be compromised.

An object of the present invention is to propose a system, a network and a method that make the transmission of data via contactless communications to an operating device used in industrial processes more secure, preventing the manipulation of sensitive data.

SUMMARY

According to one aspect, a system for securing contactless communications with an external device is provided. The system comprises:

an operating device for performing at least one of production and testing operations;

a controlling device operationally coupled to the operating device;

a receiving device configured to receive first data from the external device;

a unidirectional network configured to allow communication of the first data from the receiving device to the controlling device;

wherein:

the controlling device is configured to control the at least one of production and testing operations performed by the operating device on the basis of the first data.

According to another aspect, a network for securing contactless communications is provided. The network comprises:

a system according to the first aspect;
a first device as the external device;
a transmitting device, wherein the controlling device is configured to communicate second data resulting from the at least one of production and testing operations to the transmitting device;

a processing device and at least one network device, wherein the transmitting device is configured to transmit the second data to the processing device via the at least one network device and the processing device is configured to process the second data and to send the processed second data to the first device via the at least one network device.

According to a further aspect, a computer-implemented method of securing contactless communications exchanged between a first device and an operating device for performing at least one of production and testing operations is provided. The method comprises:

operatively coupling the operating device to a controlling device;

providing a unidirectional network between the controlling device and a receiving device;

receiving, by the receiving device, first data from the first device;

using the unidirectional network to communicate the first data from the receiving device to the controlling device;

controlling, by the controlling device, the at least one of production and testing operations performed by the operating device on the basis of the first data.

Details of exemplary embodiments are set forth below with reference to the exemplary drawings. Other features will be apparent from the description, the drawings, and from the claims.

BRIEF DESCRIPTION OF THE DRAWINGS

FIGS. 4A-4C show exemplary different configurations of the components of a system for securing contactless communications as part of a chipset, circuit board, or module.

FIG. 5 shows an example of a network for securing contactless communications.

FIG. 6 shows another example of a network for securing contactless communications.

FIGS. 8A-8C show additional examples of configurations of a network for securing contactless communications.

FIGS. 10A-10C show examples of the formats of the data transmitted according to a method of securing contactless communications.

FIGS. 11A-11C show examples of visual cryptography for an added encryption layer when utilizing visual methods for contactless communications.

DETAILED DESCRIPTION

Figure 1:
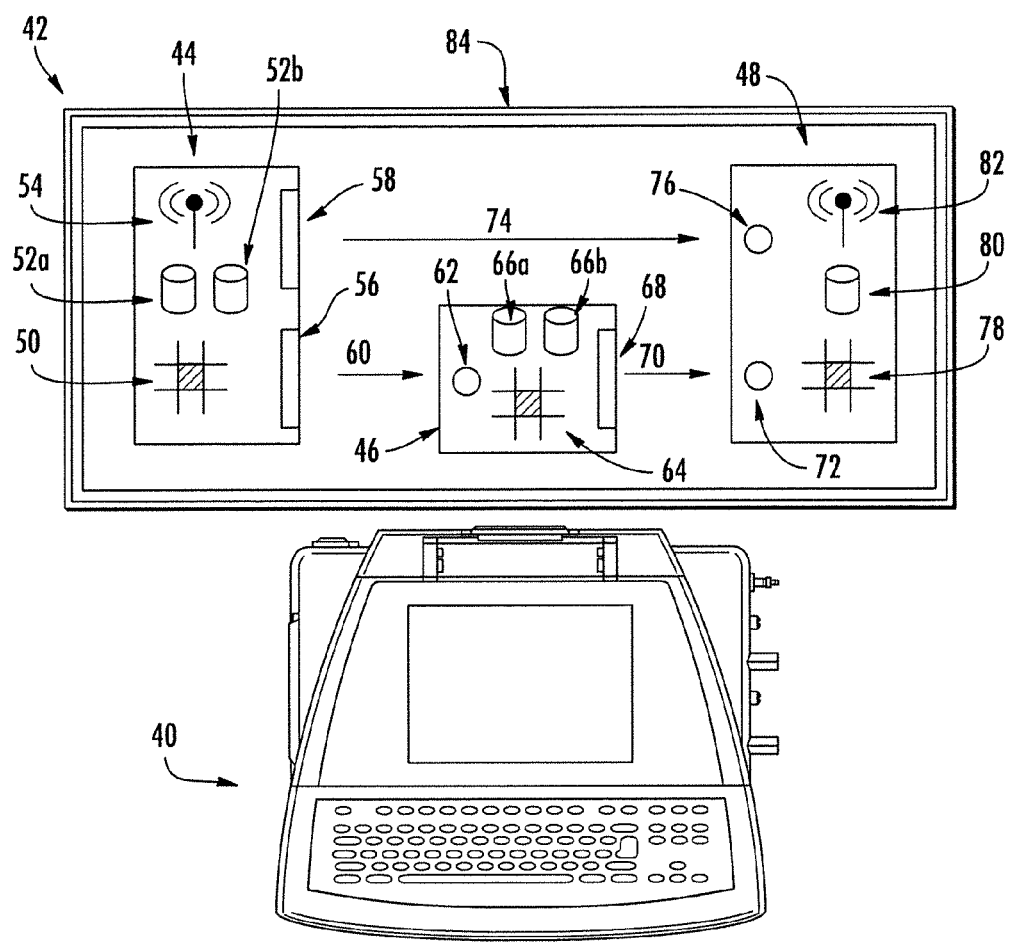
FIG. 1 shows an example of a system for securing contactless communications.

In the following text, a detailed description of examples will be given with reference to the drawings. It should be understood that various modifications to the examples may be made. In particular, one or more elements of one example may be combined and used in other examples to form new examples.

The invention described here may utilize multiple stand-alone computer modules that communicate via short-range contactless communication methods to serve as secure transitory points to transmit data from an external device to an operating device.

A contactless communication method indicates a communication method that does not require a physical contact, direct or by means of a physical connection such as a cable, between two communicating devices. The nature of contactless communications may make them more vulnerable to interception. A short-range communication method is a method of communication that requires two communicating devices to be in proximity to each other. The distance between the devices may vary according to the specific communication interface and it may exemplarily be in the order of centimeters. Short-range contactless communications may, thus, be inherently more secure, since a malicious agent must be somewhat close (e.g. not farther away than 10 meters) to the communicating devices in order to corrupt and/or manipulate the data being transmitted. In addition, a unidirectional network may be provided between the communicating devices, namely a transfer apparatus that allows data to travel (i.e. to be transmitted) only in one direction, e.g. from device A to device B but not vice versa. The unidirectionality of the data flux prevents data leakage from device B to device A caused by e.g. a malware.

The concept of utilizing a short-range contactless communication method combined with a unidirectional network architecture allows an operating device to communicate with an external device securely through an unsecure network.

Accordingly, in one example, a system for securing contactless communications with an external device may comprise an operating device and a contactless communication setup.

The operating device may be a device used to carry out at least a part of an industrial process by performing production and/or testing operations, such as chemical processes, cell culture growth and/or integrity testing. The operating device may be one of an integrity testing device, a container controlling unit, a single-use assembly controlling unit, a pump, a valve, a tank, a mixing device, a purification device, a centrifugation device, a bioreactor, a fermentation equipment, a 3D printer (e.g. a biological 3D printer), an incubator, an electronic scale, a bioprocess device, a laboratory device, a medical device and a combination thereof.

The communication setup may be external to the operating device, internal to the operating device, or partly internal, i.e. some combination of external and internal components. The communication setup may comprise a receiving device configured to receive first data from the external device, e.g. via a wired or wireless transmission. Furthermore, the communication setup may comprise a controlling device operationally coupled to the operating device, i.e. connected such that the controlling device may control the operations performed by the operating device. A plurality of receiving devices and/or controlling devices may be provided in some examples.

Additionally, the communication setup may comprise a unidirectional network configured to allow communication of the first data in only one direction, i.e. from the receiving device to the controlling device. The unidirectional network may comprise a combination of at least two devices included partly in the receiving device and partly in the controlling device, wherein the two devices may have not-interchangeable roles, in that one may only send data and the other may only acquire data.

For example, the receiving device may comprise a contactless sending component including any one of an active radio frequency identification (RFID) transmitting device, a near field communication (NFC) transmitting device, an ultrasound transmitter, an audio transmitter, a speaker, an infrasound transmitter, an infrared light emitting diode (LED) array, a visual LED array, an ultraviolet LED array, a variable augmented-reality marker display (as described in U.S. Pat. No. 8,749,396, Assembling Method, Monitoring Method, Communication Method, Augmented Reality System and Computer Program Product), a projected display, a laser emitting device, a laser projection device, a pressure device, and/or other device that may provide a contactless signal over a limited range.

Correspondingly, the controlling device may comprise a contactless acquiring component including at least one of an active RFID receiving device, a NFC receiving device, a microphone device, a sound wave receiving device, a camera device, a camera device with a filter (such as an infrared filter, an ultraviolet filter, or for polarized light), an infrared photodiode array, a visual photodiode array, an ultraviolet photodiode array, a bar-code scanner device, a laser reader device, a detector of electronic signals, a medical scanner, an electronic or visual input from industrial and/or laboratory and/or pharmaceutical equipment, a motion detection system, a visual detection system, an audio detection system, a sensory detection system, a pressure detecting device, or any electronic-input detection devices, and/or a combination of such devices.

The first data provided by the external device may comprise inter alia commands, instructions and/or operational parameters. Therefore the controlling device may control the operations performed by the operating device on the basis of first data, namely according to the content of the first data. For example, the controlling device may trigger the start of a test operation and/or change the parameters of the test operation.

The separation between the receiving device and the controlling device is a form of air-gapping that isolates the controlling device from unsecure, external networks. Exemplarily, the first data may be subject to certain requirements, e.g. regarding the format of the data, so that even if a computer virus or worm infected the receiving device, which is the most vulnerable component in the setup due to receiving information from the external device via e.g. an external network, any data that do not comply may result in the receiving device being cut off from the rest of the system and reformatted or, in other examples, physically removed and replaced. This ensures that only the proper information may be received, packaged, and transmitted through the contactless communication setup. If the information is invalid, it will not be accepted by the controlling device.

Denial of service (DoS) or Distributed Denial of Service (DDoS) attacks may be prevented by blocking the originating IP addresses (e.g. at the firewall or at the Internet Service Provider level) and only accepting connection requests or data from verified devices or sources. The external device utilized e.g. by an operator may undergo initial verification through authentication within physical proximity to the operating device and/or communication setup. For example, this may be achieved by exchanging a randomly generated key through a direct contactless communication method between the operating device and the external device, in order to ensure that the external device has physical access to the operating device and is not originating from a different, unauthorized external source. Such a verification method may be utilized for a plurality of operating devices and external devices using the communication infrastructure proximal to the operator, including e.g. modems, switches, cell towers, microcells, and so on.

According to one example, a Faraday cage may be employed to attenuate or block external sources of electromagnetic radiation, in order to seal off the contactless communication setup from external sources of communication. A Faraday cage may protect signals, such as short range RFID, NFC, or other radio signals, to prevent any leakage of those signals to the external environment, where they may be intercepted. Parts of the receiving device, such as an antenna, may be expertly designed to be placed outside of the Faraday cage, so that wireless signals may be received while maintaining the security within the contactless communication setup. Sound absorbing or other sound dampening materials and/or geometries may be employed to isolate acoustic signals from leakage into the external environment.

In some examples, the production and/or testing operations performed by the operating device may generate second data, such as test results. The second data may be of relevance e.g. for subsequent operations or diagnostics purposes and it may, thus, be useful to communicate the second data e.g. to the operator in control of the external device. Accordingly, the communication setup may further comprise a transmitting device (or a plurality thereof). The second data resulting from the operations may be communicated by the controlling device to the transmitting device. The communication method between the controlling device and the transmitting device may also be a contactless, short-range communication method. Exemplarily, the system may comprise a second unidirectional network used to ensure that data can only flow from the controlling device to the transmitting device and not vice versa. The transmitting device may then transmit the second data to the external device, through which the operator may safely receive the second data. The unidirectional nature of the setup ensures that the operation data (second data) collected and stored within the controlling device are secure and reliable, and may serve as reference data.

In some examples, the receiving device and the transmitting device may also be in direct communication with each other, as will be explained in more detail with reference to a network.

FIG. 1 shows an example of a system for securing contactless communications, which comprises an operating device 40 (top view), such as an integrity testing device, and a contactless communication setup 42. In this example, the communication setup 42 may be internal to the operating device 40. The contactless communication setup 42 may include at least one receiving device 44, at least one controlling device 46, and at least one transmitting device 48. In this example, at least one display device may be utilized as the contactless sending component and at least one camera may be used as the contactless acquiring component of a unidirectional network. The receiving device 44 may, thus, comprise display devices 56 and 58 as contactless sending components to communicate data to the controlling device 46 and/or to the transmitting device 48. Similarly, the controlling device 46 may comprise display device 68 to communicate data to the transmitting device 48. The controlling device 46 may also comprise a camera 62 to acquire data from the receiving device 44. The transmitting device 48 may comprise cameras 72 and 76 to acquire data from the receiving device 44 and/or from the controlling device 46. The display devices 56, 58, 68 may exemplarily show visual, variable augmented-reality markers. The communication method, frame rates, speed of data transfer, and equations are further described in U.S. Pat. No. 8,749,396, Assembling Method, Monitoring Method, Communication Method, Augmented Reality System and Computer Program Product.

The receiving device 44 may be a computer containing its own processor 50, storage devices 52a, 52b, and/or networking device 54 such as an antenna. The receiving device 44 may receive first data from an external device through the networking device 54 and convert the first data into a series of images such as visual augmented reality markers utilizing the processor 50. This series of images may be displayed on the display device 56 for unidirectional communication in the form of signal 60 with the controlling device 46 and/or the display device 58 for unidirectional communication in the form of signal 74 with the transmitting device 48.

The controlling device 46 may be a computer comprising its own processor 64 and/or storage devices 66a, 66b and the controlling device may receive the signal 60. The series of images presented on the display device 56 to the controlling device 46 may be imaged by the camera 62, processed by the processor 64 and stored within at least one of the storage devices 66a, 66b.

The data provided may be utilized to perform an operation at the operating device 40, such as initiating a test, changing the parameters of a test program, updating a database, and/or providing a software update to the system. The operation performed by the operating device 40 may produce second data, such as the results of a test, measurements, and/or error code. The second data may be converted into a series of images such as visual augmented reality markers utilizing the processor 64 and automatically communicated to the transmitting device 48 through a signal 70.

The transmitting device 48 may be a computer comprising its own processor 78, storage device 80 and/or networking device 82, such as an antenna. It may receive the signal 70 from the display device 68 utilizing the camera 72. The series of images presented on the display device 68 to the transmitting device 48 may be imaged by the camera 72, processed by the processor 78, stored within the storage device 80, and transmitted to the external device and/or to a network comprising e.g. a cloud computing server (as described below) through the networking device 82.

A Faraday cage 84 may be employed to attenuate or block external sources of electromagnetic radiation to seal off the communication setup 42 from external sources of communication. If a Faraday cage 84 is employed, the networking devices 54 and 82 may be expertly positioned outside of the Faraday cage 84 for receiving and transmitting signals externally.

Figure 2:
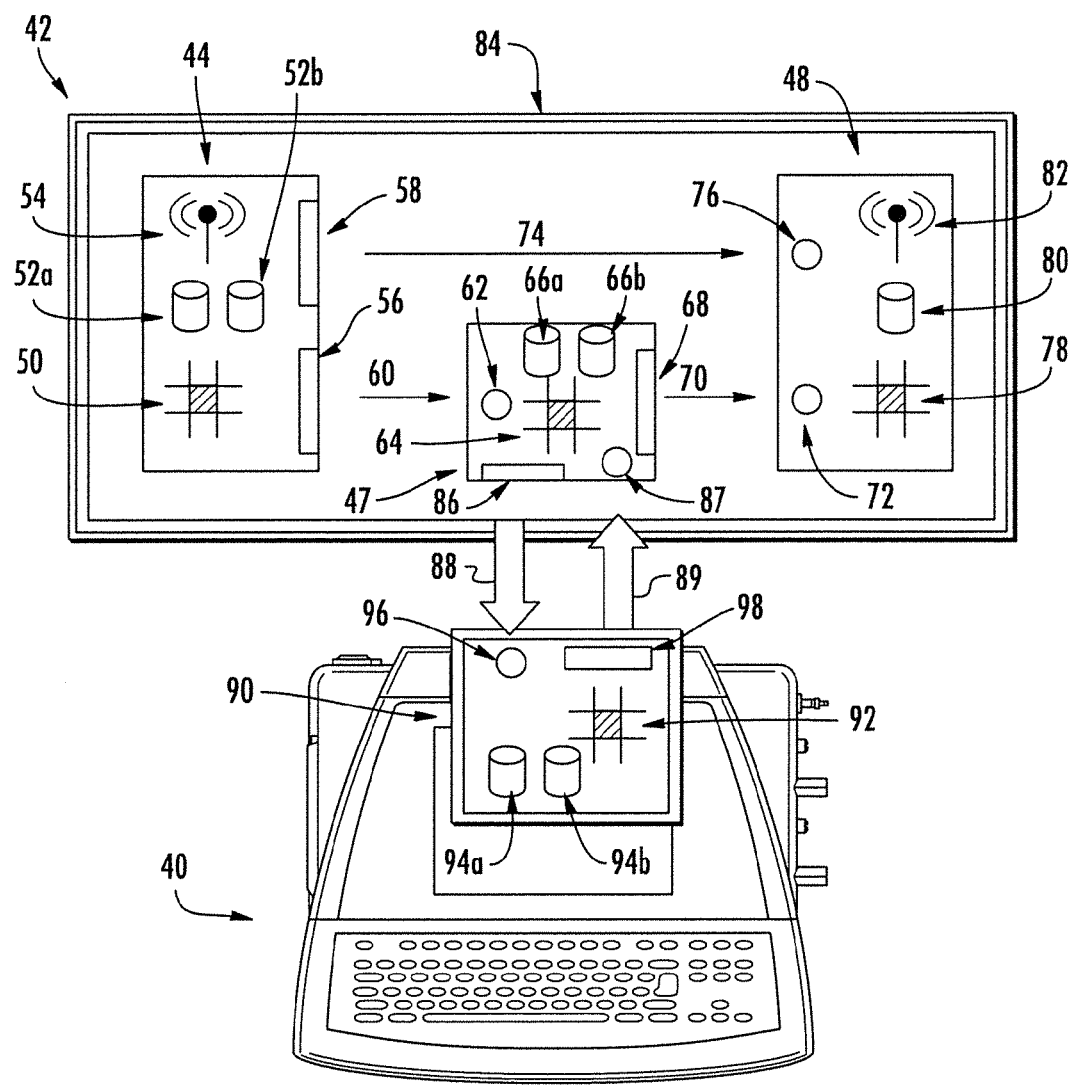
FIG. 2 shows another example of a system for securing contactless communications.

FIG. 2 shows another example of a system for securing contactless communications, in which the operating device 40 itself contains its own internal processor unit 90, which communicates with the receiving device 44 and the transmitting device 48 through an intermediary device 47. In this example the controlling device corresponds to the combination of processor unit 90 and intermediary device 47. The receiving device 44, the transmitting device 48 and the intermediary device 47 may be external to the operating device 40. The communication setup 42 may, thus, include the receiving device 44, the transmitting device 48, the intermediary device 47 and the processor unit 90. The same reference numbers are used to designate elements having the same function as in FIG. 1 and a description thereof may be at least partly omitted.

The intermediary device 47 may contain the same elements as the controlling device 46 of FIG. 1, plus an additional display device 86 and an additional camera 87. The display device 86 uses a series of images such as augmented reality markers as the contactless communication method to transfer data to the processor unit 90, which is internal to the operating device 40. The processor unit 90 may comprise a camera 96, a display device 98, a processor 92 and storage devices 94*a*, 94*b*. The series of images presented on the display device 86 through a signal 88 to the processor unit 90 may be imaged by the camera 96, processed by the processor 92 and stored within the storage devices 94*a*, 94*b*.

The processor unit 90 may, in turn, communicate directly with the intermediate device 47 using a series of images such as augmented reality markers on the display device 98 through signal 89 and imaged by the camera 87. For example, the second data from the processor unit 90 may be transferred through the intermediate device 47 to the transmitting device 48.

A Faraday cage may be employed around the processor unit 90 to attenuate or block external sources of radio waves or electromagnetic radiation to seal off the communication setup 42 from external sources of communication. The example of FIG. 2 may provide an additional layer of protection where the receiving device 44, the intermediary device 47 and the transmitting device 48 are separated from the processor unit 90 onboard the operating device 40. This allows for the receiving device 44, the intermediary device 47 and the transmitting device 48 to be completely deactivated, isolated, or physically removed from the operating device 40 without affecting the operations of the device 40.

Figure 3A:
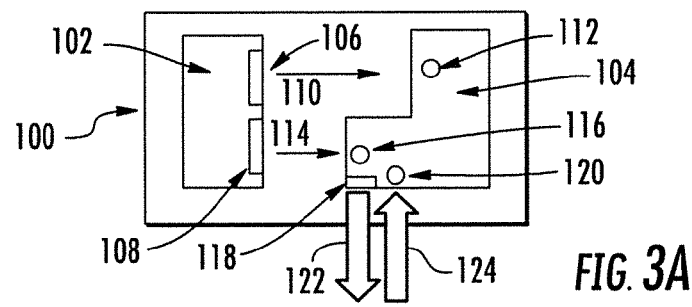
FIGS. 3A-3C show exemplary different configurations of the components of a system for securing contactless communications.
Figure 3B:
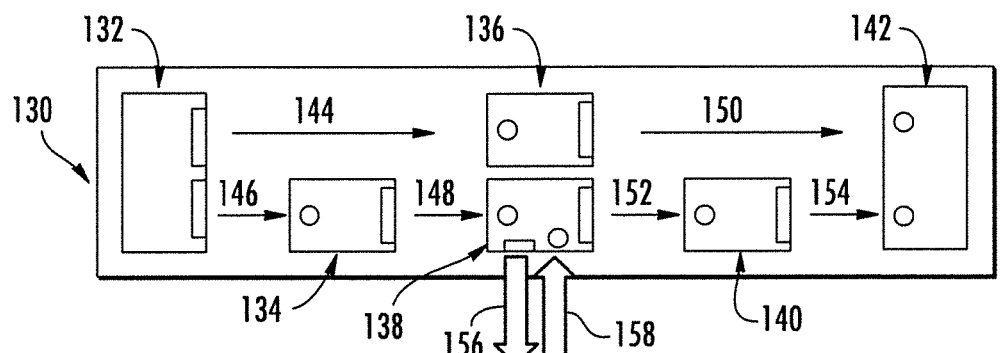
Figure 3C:
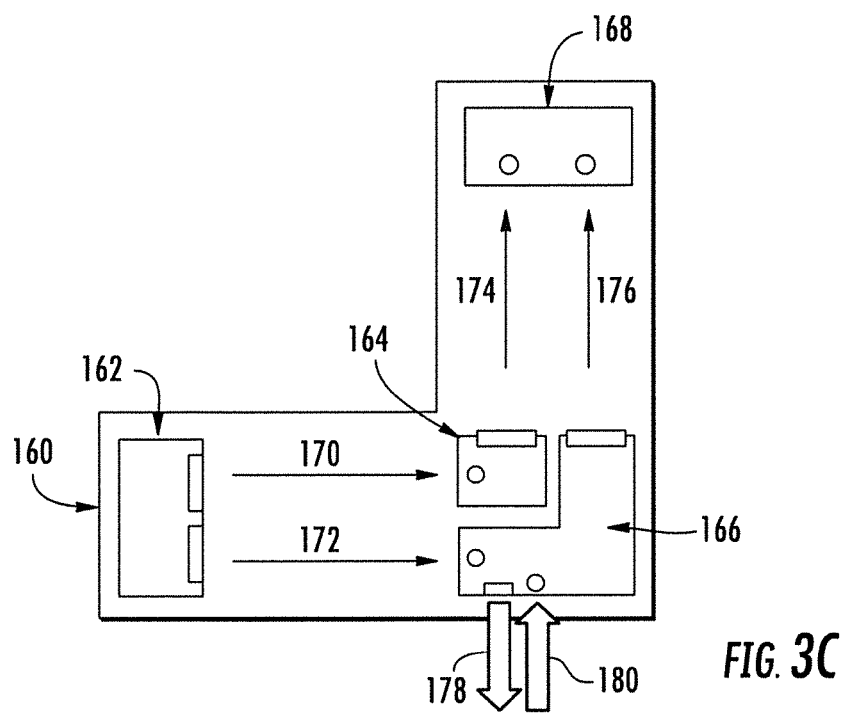

FIGS. 3A-3C show exemplary different configurations of the components of a system for securing contactless communications, in particular the components of a communication setup as shown in FIG. 2.

FIG. 3A is a top view of a contactless communication setup 100 that comprises at least one receiving device 102 and at least one combination intermediary device and transmitting device 104.

The receiving device 102 may receive external data utilizing a networking device (not shown) and convert the data into coded information using a processor (not shown) for transfer via a contactless communication method.

The receiving device 102 may then communicate, using a contactless sending component 108, the data as a signal 114 to a contactless acquiring device 116 in the intermediary device portion of the combination intermediary device and transmitting device 104. The intermediary device portion of the combination intermediary device and transmitting device 104 may transmit and receive data to and from a processor unit (not shown) utilizing a contactless sending component 118 and a contactless acquiring component 120, where the pathways are represented by the communication arrows 122 and 124.

Additionally or alternatively, a contactless sending component 106 may communicate the data as a signal 110 to a contactless acquiring component 112 in the transmitting device portion of the combination intermediary device and transmitting device 104, which may then transmit the data to an external device utilizing a networking device (not shown).

FIG. 3B is a top view of another example of a contactless communication setup 130 that comprises at least one receiving device 132, a plurality of intermediary devices 134, 136, 138 and 140, and at least one transmitting device 142. At least some of these devices may include contactless sending and/or acquiring components to carry out contactless communications.

The receiving device 132 may receive external data utilizing a networking device (not shown) and convert the data into coded information using a processor (not shown) for transfer via a contactless communication method. The contactless communication transmitting and receiving methods utilized between devices may be similar or may be different between different devices within the contactless communication setup. Altering the contactless communication methods may make the contactless communications setup more secure.

The receiving device 132 may communicate the data as signal 146, using a contactless communication method, to the initial intermediary device 134. Using similar contactless communication methods, the data may pass as signal 148 from the initial intermediary device 134 to the secondary intermediary device 138, as signal 152 from the secondary intermediary device 138 to the tertiary intermediary device 140, and as signal 154 from the tertiary intermediary device 140 to the transmitting device 142. The secondary intermediary device 138 may transmit and receive data to and from a processor unit (not shown) utilizing a contactless communication method, where the pathways are represented by the communication arrows 156 and 158.

Additionally or alternatively, the receiving device 132 may contactlessly communicate the data as signal 144 to the intermediary device 136, which in turn may send the data as signal 150, using a contactless communication method, to the transmitting device 142. The transmitting device 142 may transmit the data to an external device utilizing a networking device (not shown).

FIG. 3C is a top view of another example of a contactless communication setup 160 that comprises at least one receiving device 162, a plurality of intermediary devices 164 and 166, and at least one transmitting device 168, where all of the devices may be oriented at a plurality of angles with one another.

The receiving device 162 may receive external data utilizing a networking device (not shown) and convert the data into coded information using a processor (not shown) for transfer via a contactless communication method.

The receiving device 162 may communicate the data as signal 172, using a contactless communication method, to the intermediary device 166, which in turn may transmit the data as signal 176 at an angle of about 90 degrees to the transmitting device 168. The intermediary device 166 may transmit and receive data to and from a processor unit (not shown) utilizing a contactless communication method, where the pathways are represented by the communication arrows 178 and 180.

Additionally or alternatively, the receiving device 162 may communicate the data as signal 170 to the intermediary device 164, which in turn contactlessly communicates the data as signal 174 at an angle of about 90 degrees to the transmitting device 168. The transmitting device 168 may transmit the data to an external device utilizing a networking device (not shown).

FIGS. 4A-4C show exemplary different configurations of the components of a system for securing contactless communications as part of a chipset, circuit board, or module. In particular, components of contactless communication setups as described for the previous figures are shown.

FIG. 4A is a top view of an example of a chipset 200 containing a contactless communication setup on a single chip. The chipset 200 may include connection prongs 202 for insertion into a computer or mobile device board. The chipset 200 may for example contain an internal contactless communication setup that comprises at least one receiving device 204, at least one controlling device 206, and at least one transmitting device 208. The chipset 200 may receive external information/data via the receiving device 204, use a contactless communication method to send that information to the controlling device 206, and use a contactless communication method to send the data to the transmitting device 208, which may further send the information to an external device and/or network.

FIG. 4B is a top view of an example of a circuit board 210, which may be a computer circuit board or a mobile device circuit board, containing the contactless communication setup on a single board. The circuit board 210 may include the contactless communication setup within a Faraday cage enclosure 212. The circuit board 210 may contain an internal contactless communication setup that includes at least one receiving device 214, at least one intermediary device 216, and at least one transmitting device 218. The intermediary device 216 may communicate with a processor unit 220. The circuit board 210 may receive external information/data via the receiving device 214, which may contain an antenna outside of the Faraday cage 212, and use a contactless communication method to send that information to the intermediary device 216 and also to send and receive information to and from the processor unit 220. The intermediary device 216 may also use a contactless communication method to send the data to the transmitting device 218, which may contain an antenna outside of the Faraday cage 212 and may further send the information to an external device and/or network.

FIG. 4C is a top view of an example of a modular device 222 such as a modular mobile device. The modular device 222 contains modules with different functionalities, which may be inserted or connected to the frame of the modular device. The modules may contain functionalities such as a connectable camera 224, a battery, a display screen, and/or a contactless communication setup which may be connectable to the modular device 222 to provide the functionality to the device 222. In some examples, the contactless communication setup may be inserted into various mobile devices, including but not limited to, a smartphone, a laptop computer, a tablet computer, an augmented reality device, a virtual reality device, a heads-up-display (HUD), a wearable device, a medical device tracker, a medical device, a smartwatch, a drone or unmanned aerial vehicle (UAV), a robotic device, an input device (such as a keyboard; stylus; biosensors; a motion scanner, a depth scanner, or other a gestural scanning device; and so forth) or any combination thereof.

As discussed with reference to the examples of FIGS. 1 to 4, a system according to the invention, comprising an operating device and a communication setup, allows for secure transmission of first data (such as instructions) from an external device via a receiving device to a controlling device that controls the operations of the operating device. Furthermore, such a system may additionally allow for secure transmission of second data (such as test results) from the controlling device to the external device via a transmitting device. As already discussed, the transmitting device may additionally or alternatively transmit data to other external devices and/or an external network. Furthermore, the receiving device and the transmitting device may securely communicate directly with each other. These features of the system may provide additional functionalities, such as data processing and data verification.

Exemplarily, a network for securing contactless communications may comprise a system including an operating device, a controlling device, a receiving device and a unidirectional network; an external device or first device; a transmitting device; at least one network device; and a processing device.

The external device may be e.g. operated by an operator and may send first data such as instructions to the receiving device. The external device may be or comprise e.g. a mobile phone or a laptop.

The functions of the components of the system may include those already illustrated and comprise additional ones. In particular, the communications between the devices in the communication setup (i.e. the controlling device, the receiving device and the transmitting device) may be contactless, unidirectional and short-range also when not explicitly specified.

The controlling device may communicate second data such as test results to the transmitting device and the transmitting device may transmit the second data to the processing device via the network device. The network device may be or comprise e.g. a router, a networking cable or a repeater. The signal sent from the transmitting device through the network device may be wired or wireless and the network device may be internal or external to the transmitting device.

The processing device may receive the second data and process them. For example, the processing device may comprise a cloud computing server and/or a database. The data transmitted to the processing device may be stored, undergo aggregation, statistical calculation and/or summarization. The processed (second) data may be sent to the external device, and subsequently to the end user operating it, as value-added data complete with customized data visualization. The processing device may transmit the processed data via a network device, which may be the same interfacing the transmitting device and the processing device or a different, second network device, as a wired or wireless signal. The data collected by the processing device may exemplarily be invaluable to the global analysis of operating device quality (particularly for consumables such as filters, bags, etc.), for building massive databases with useful user information, determining how users utilize data and providing new analysis/visualization tools to assist the end user, developing new product offerings, identifying and reporting of customer issues and offering assistance before initiating contact with the manufacturer. The processing device may additionally verify the validity of the test result data from the controlling device and provide recommendations to the operator if there are any issues.

Additionally or alternatively, the receiving device may communicate the first data directly to the transmitting device, e.g. before and/or while communicating the first data to the controlling device. The transmitting device may then transmit the first data to the processing device (via the network device) to be analyzed, e.g. authenticated. For example, the first data may be commands or software upgrades for the controlling device saved on the receiving device prior to transmission to the controlling device 16. The processing device, which may exemplarily comprise a cloud computing server, may contain a copy of the first data as inputted in the external device. If the data transmitted from the transmitting device (and originally from the receiving device) matches the data stored in the processing device, then the processing device may send a signal to the receiving device to authorize transmission to the controlling device. If there is no match with the stored data, then the processing device may send a signal to the receiving device to cease activities until the cause of the discrepancy may be diagnosed and corrected.

The most critical application for this network setup may be the updating, upgrading, or restoring of software remotely through the network, as it involves the opportunity of changing the process code on the controlling unit. In this case, further precautions may be taken to ensure that the program code for the update/upgrade/restoration is verified to be the same code provided by the originating organization.

In one example, a message may be sent to the receiving device that an update will be coming. The receiving device may format one of the storage devices to empty it of all previous data. The update/upgrade/restoration file data are sent to the receiving device, which may save them in the emptied storage device. The receiving device then may use a contactless communication method to transmit the data to the transmitting device, which may save them in a storage device. The transmitting device sends the data file through the network to the originator's processing device, where the entire contents of the data are verified to be identical. The processing system may send a command (e.g. encrypted) to the receiving device to transfer the data to the controlling device. The controlling device may receive notification of the update by the receiving device and also format one of a plurality of storage devices. The receiving device may then transfer the data to the controlling device using a contactless communication method. In some examples, the controlling device may further transfer the data file to the transmitting device, which sends it to the processing device for additional verification. An additional command (e.g. encrypted) may be transferred via the network to the receiving device, which sends it to the controlling device to give the instruction to extract and install the update/upgrade/restoration file. In other words, data may be cycled through the network allowing for the constant verification and validation by the controlling device and the processing device.

In another example, a checksum of the data transmitted within the contactless communication setup may be performed by sending a shortened segment of the data through the unidirectional setup of the contactless communication setup and through the network to the processing device, and back to the contactless communication setup. For high speed data transfer, the contactless communication devices may use interpolated data over a segment of time to allow for the storage and interpolation of data that are transmitted at a speed faster than what may be detected by an acquiring component (e.g. a camera). In this case, a sending component (e.g. a display device) may transmit data at significantly faster rates than the acquiring component may read upon the first pass. The transmitted data may be repeated several times with the acquiring component being able to record more of the data on each successive pass until the complete data set is available. From here, software may piece together the segments and place them in the proper order allowing for the entire data set to be read.

The contactless communication setup may additionally be utilized by networked sensor components independent of the systems that they are linked to. Adding the contactless communication setup to sensor components allows for secure communication and data exchange with components utilized for the Internet of Things (IoT). The Internet of Things may contain networks of sensors that may report critical information (such as temperature, pressure, flow rates, or other parameters) or for wearable and/or health monitoring devices which may detect heart rate, blood pressure, glucose levels, or other critical data. The contactless communication setup may allow for secure remote control (via e.g. a mobile device) of devices that utilize these sensor-collected data to perform an action, such as adding warm glycol to a jacketed bioreactor if the temperature sensor detects the temperature drop below an established threshold, reducing the pump speed if the pressure of a tubing assembly exceeds a specification, adding insulin from an internal pump when glucose levels are too high, or calling for medical assistance if the blood pressure exceeds a certain level. All of these scenarios require a secure communication platform to receive data and analyze the sensor data, have an individual or computer system make a decision based on the sensor data, and to perform an action based on the data received. The operator may change the parameters, the sensor ranges or specifications, or the action to be performed all from a mobile device utilizing the contactless communication setup for secure communications.

One or more components of the network may individually and/or jointly maintain an audit trail (or audit log) of at least part of a sequence of activities that took place within the network (e.g. commands issued, actions performed, changes to the parameters and/or specifications, test results and calculations performed on the collected data, error messages and error codes, transactions sent and received, secure payment transactions, quote requests, electronic batch records, completed connections, operator usage/performance, and data sent and received).

The audit trail may be searchable to view all of the stored interactions by date, time, subject, action type, etc. All instances of incorrect, incomplete, or malicious attempts to perform a change or action, which were not actually performed, may be additionally logged into the audit trail. If incorrect data, incomplete commands, or malicious commands are detected, the receiving device in the contactless communication setup may be instructed from the processing device to erase and/or reformat the storage device containing the data or commands that do not conform to the prescribed norms. The individual devices of the contactless communication setup, such as the plurality of receiving devices, controlling devices, intermediate devices, and transmitting devices or the entire contactless communication assembly in whole or in part may be replaceable and/or disposable. In some instances where there is a high level of security required, the individual devices and/or the contactless communication setup in whole or in part may be single-use and discarded between each batch, after a selected interval, or after each security intrusion attempt.

FIG. 5 shows an example of a network for securing contactless communications. The network may comprise an operating device 10 connected to an internal/external contactless communication setup 12, which includes at least one receiving device 14, at least one controlling device 16, and at least one transmitting device 18. The features of this system have already been described with reference to FIGS. 1 to 4 and may be at least partly omitted in the following. The network may further comprise a first device or external device 36, network devices 22 and 30 and a processing device 26. In some examples, network devices 22 and 30 may coincide.

The external device 36 operated by an end user or operator may send data to the receiving device 14 directly utilizing a wired/wireless transmission 38, a contactless communication method (not shown), or go through the network device 30, which may send a wired/wireless signal 32 to the receiving device 14.

As previously explained, the external device 36 may send first data via the receiving device 14 to the controlling device 16 and trigger operations of the operating device 10, the results of which are second data communicated to the transmitting device 18. The transmitting device 18 may send a wired/wireless signal 20 to the internal/external network device 22. This network device 22 may transmit the second data via a wired/wireless signal 24 to the processing device 26, which may comprise a network database and/or a cloud computing server. The second data may be stored in the processing device 26, aggregated with other data, and/or have calculations, statistical analysis, and algorithms performed on them. After processing, the (processed) second data may be transmitted to the end user operating the external device 36 through a wired/wireless signal 28 using an internal/external network device 30. This network device 30 may transmit the data via a wired/wireless signal 34 to the external device 36 (e.g. a mobile device).

The processing device 26 may additionally or alternatively be used to verify the authenticity of data. The receiving device 14 may directly communicate the first data to the transmitting device 18 via a contactless communication method. The data may be transmitted from the transmitting device 18 via the network device 22 and analyzed by the processing device 26. If the data transmitted from the receiving device 14 matches the data in the processing device 26, then the receiving device 14 may receive an encrypted authorization code to begin/continue transmission to the controlling device 16. If the data transmitted from the receiving device 14 does not match the data from the processing device 26, then the processing device may send a signal to the receiving device 14 to cease activities until the cause of the discrepancy may be diagnosed and corrected. The validation function of the processing device 26 is not limited to the first data. The authenticity of second data such as test results may also be verified, e.g. by comparing the data to test results previously stored in the processing device 26.

In the most critical applications, such as a software upgrade or update from the processing device 26 to the operating device 10, the receiving device 14 may format one of the storage devices and completely erase all of the items previously stored on the device. The software upgrade/update may be stored on this empty storage device. The receiving device 14 may communicate directly with the transmitting device 18 using a series of images such as augmented reality markers. The transmitting device 18 may transmit the data uploaded to the receiving device 14 and stored in the storage device to the processing device 26. This would allow the signal received by the receiving device 14 to undergo verification of the authenticity of the data. The processing device 26 may send an encrypted authorization code to the receiving device 14 to authorize the sending of the software upgrade/update to the controlling device 16. Additionally, the data may be transmitted a second time via the transmitting device 18 from the controlling device 16 to the processing device 26 for verification. The processing device 26 may then send an encrypted authorization code to the receiving device 14 and then to the controlling device 16 to authorize the extracting and installing of the software upgrade/update to the controlling device 16.

FIG. 6 shows another example of a network for securing contactless communications. This example shows a network where an operating device 230, which is a bioreactor process device, is connected to an internal/external contactless communication setup 232. An external device such as mobile device 242 may communicate directly to a processing device such as a cloud computing server 240 to provide a command for the bioreactor to execute and/or a request for measurement data from sensors located within the operating device 230. The data/instruction may include the parameters and the initiation of a test or measurement, the changing of parameters during a test, additional data for the operating device database, or the upgrading of the controlling device software through a software update. The communication pathways from the mobile device 242 to and from the cloud computing server 240, as represented by arrows 243 and 244, may be over an unsecure or secure wireless, cellular, and/or other communication network method. The data may be unencrypted or encrypted, and may be routed through several third party applications, servers, and/or networks. The cloud computing server 240 may send an encrypted message, represented by arrow 246, to a wireless router 248 over the network. The wireless router 248 may send the encrypted message through a wireless signal, represented by arrow 250, to the contactless communication setup 232. The contactless communication setup 232 may securely transmit the encrypted message through a contactless communication method to the operating device 230 for the execution of the command from the mobile device 242 and the request for a measurement from the internal sensor device to be provided to the mobile device 242. The operating device 230 may utilize a contactless communication method to transmit the sensor measurement data to the contactless communication setup 232. Subsequently, the encrypted or unencrypted message containing the data may be transmitted wirelessly to a wireless router 236, represented by arrow 234. The wireless router 236 may be the same as wireless router 248 or a separate wireless router that only receives information from devices within an established location, such as internal to a manufacturing facility. This wireless router 236 may transmit the data, represented by arrow 238, to the cloud computing server 240. The contactless communication setup 232 may communicate directly to the cloud computing server 240 through a cellular, satellite, or other network method. The network address to the cloud computing server 240 may be hard encoded into the contactless communication setup 232 and/or the wireless router 236 so that transmissions are made only to that specified network address and this configuration cannot be altered by software coding. This may prevent the contactless communication setup 232 and/or the wireless router 236 from sending sensitive data to an alternate network address, to a spoof network address, or to a network address that has been altered by malicious code uploaded to the contactless communication setup 232 or the wireless router 236. The cloud computing server 240 may perform calculations or data visualization for the received sensor measurement data from the operating device 230 and provide it to the mobile device 242, as represented by arrow 244, as an encrypted or unencrypted format, for the user to view.

Figure 7:
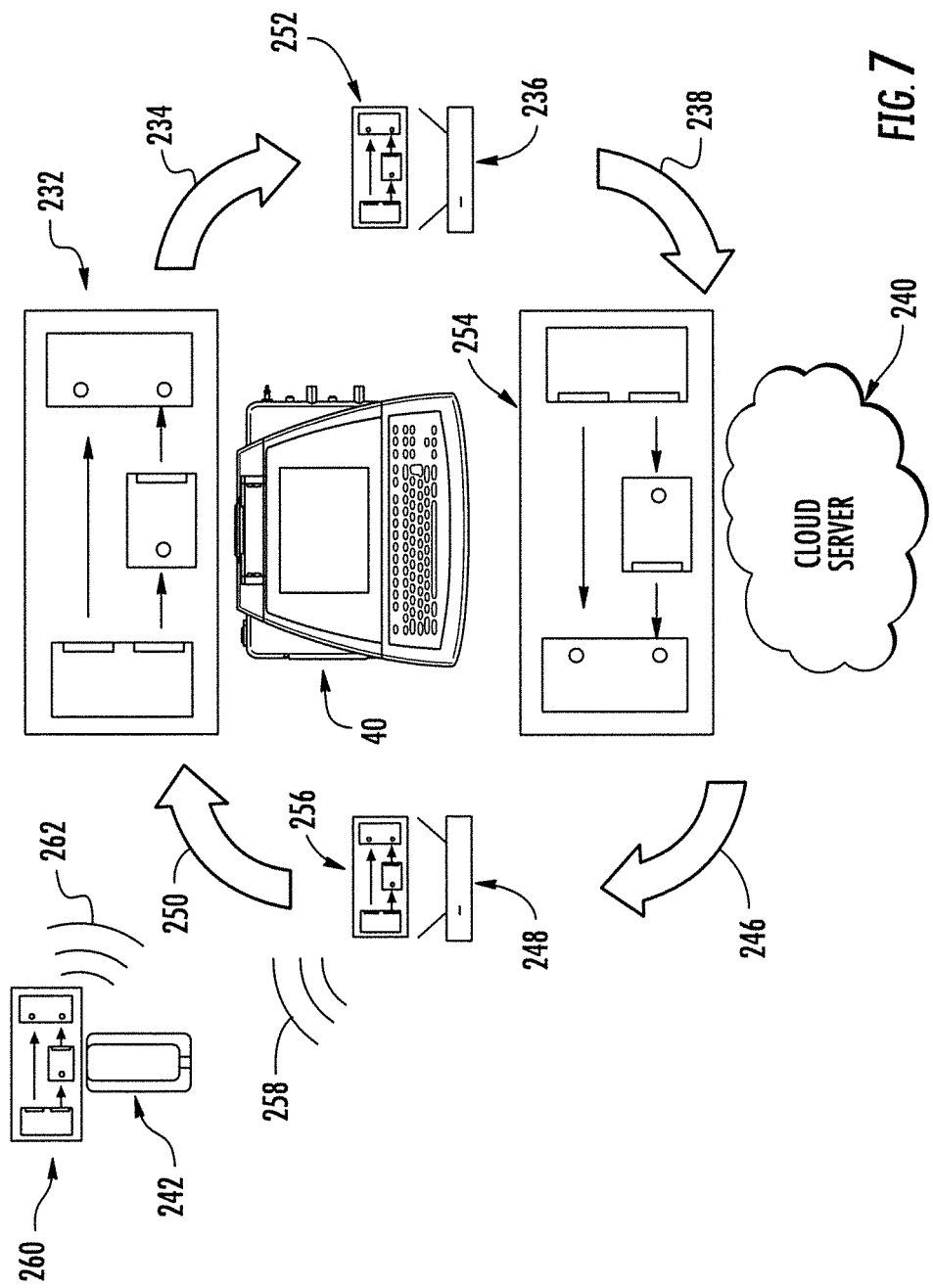
FIG. 7 shows a further example of a network for securing contactless communications.

FIG. 7 shows a further example of a network for securing contactless communications, wherein a plurality of contactless communication setups are used to provide a secure ecosystem to communicate and validate data transmitted between devices. This example provides multiple additional layers of protection and validation of data, reducing the possibility for any device in the networking ecosystem to be compromised. The same reference numbers are used to designate elements having the same function as in FIG. 6 and a detailed description thereof may be at least partly omitted.

A network is shown in which all devices are connected internally and/or externally to contactless communication setups 232, 252, 254, 256, and 260. In other examples, only some of the devices may be connected to contactless communication setups. A mobile device 242 may include the contactless communication setup 260 and send a data signal 262 to provide e.g. a command for an operating device 40 to execute and to request measurement data from the operating device 40. The signal 262 is received by the contactless communication setup 232 for the operating device 40. The contactless communication setup 232 records the data and uses its transmitting device to send the data to a wireless router 236, as represented by arrow 234. The wireless router 236 may include a contactless communication setup 252 that records the data and uses its transmitting device to send the data to a cloud computing server 240, as represented by arrow 238. The cloud computing server 240 may contain the contactless communication setup 254 that records the data and uses the communication pathway to analyze the data for validity and approve the command execution and the measurement data request. An encrypted passcode may be generated by the cloud computing server 240 and sent via the transmitting device to a wireless router 248, as represented by arrow 246. The wireless router 248 may include the contactless communication setup 256 that records the data and uses its transmitting device to send the data to the contactless communication setup 232 of the operating device 40, as represented by arrow 250. The encrypted passcode may be received by the receiving device in setup 232 and sent to the operating device 40, using a contactless communication method, to authorize the execution of the command and the providing of measurement data.

The measurement data from the operating device 40 are sent via the network, along the same communication paths 234 and 238 illustrated above, to the cloud computing server 240. The cloud computing server may analyze the measurement data for validity, process the data through calculations, visualizations, add historical data, and/or provide recommendations and context, or other value added algorithms to the measurement data. The processed data may be sent via the wireless router 248 and its communication setup 256 to the mobile device 242, as represented by arrow 258. The mobile device 242 may receive the data with its communication setup 260 and record the edited measurement data. The data may then be provided to the mobile device display for the operator to view on the device or within an app and/or computer program on the device. The operator may manipulate the data and view it with the calculations, visualizations, historical data, and recommendations provided by the cloud computing server 240. The operator may request new measurement data or issue additional commands to the operating device 40.

After the operator views the data on the mobile device 242, a message that the data have been received may be sent to the operating device 40 for verification on the validity of the underlying data provided. The confirmed data may be sent around the network to the cloud computing server 240, which provides the final analysis by checking that the measurement data that were sent and received are the same. A validation token may be generated by the cloud computing server 240 and sent around the network to verify that the initial command sent was properly executed, the measurement data was properly received, and that there are no issues or signs of tampering detected within the network. After the validated token is received and recorded by the cloud computing server 240, the cloud computing server 240 may generate a deletion token, which is sent around the network setup to delete all of the related recorded data for the command and the measurement data from memory in each of the contactless communication setups 232, 252, 254, 256, and 260.

The example described here allows for verification of data and for creation of an audit trail for each step carried out in the network infrastructure, to ensure that the commands issued by the operator from the mobile device 242 are verified and approved as appropriate by the central cloud computing server 240 prior to execution of the command by the operating device 40. The data are also verified by the operating device 40 for the cloud computing server 240, which also requires verification and validation of the data that it stores. Ultimately, the most critical data of test results on the operating device 40 that may undergo auditing by a regulatory agency are unaffected and secure within the operating device 40 itself thanks to the contactless communication setup 232. The security may be extended to the other network devices as well, e.g. by providing that the software of those devices cannot be changed without verification and an encryption key by the cloud computing server. This will protect the source code from routers and other network equipment from being altered to send the data to other network addresses. If any part of the network ecosystem is compromised by an external attack, the affected contactless communication system may shutdown, erase all data stored in memory, and start over without affecting the data on the operating device 40, the cloud computing server 240, the mobile device 242, or related network devices. Denial of service (DoS) and Distributed Denial of Service (DDoS) attacks may be prevented by blocking the originating IP addresses (at the firewall or internet service provider level) only accepting connection requests or data from verified devices. The mobile device 242 may be verified by receiving a randomly generated key via a direct contactless communication method ensuring physical proximity to the operating device 40 itself.

The network setup of the above example may be expanded to include a plurality of operating devices and/or devices used in the communication infrastructure including modems, switches, cell towers, microcells, and so on. In other examples, some devices may be left out.

FIGS. 8A-8C show additional examples of configurations of a network for securing contactless communications.

FIG. 8A is a top view of a network where a mobile device 300 including an internal/external contactless communication setup 302 communicates with a cloud computing server 304, as represented by the arrows 306. The cloud computing server 304 may further communicate, as represented by arrows 308, with at least one additional mobile device 310 that also includes an internal/external contactless communication device 312. This allows for data to be securely shared from one mobile device 300 to another mobile device 310 using the cloud computing server 304 as an intermediary. The secure mobile-to-cloud data pathway may ensure that the data sent were the same as received, were properly validated, and/or are free of malicious code prior to installing on mobile device 300 and/or 310. The cloud computing server 304 may additionally provide value-added services to the data sent, such as calculations, data visualizations, historical data, secure payment transactions, quote requests, electronic batch records, completed connections, operator usage/performance, recommendations and context, or other value added algorithms to the mobile devices 300 and 310.

FIG. 8B is a top view of a network where a mobile device 320 includes an internal/external contactless communication setup 322 and communicates directly with at least one other mobile device 326 including an internal/external contactless communication setup 328 in a mobile-to-mobile (peer-to-peer) pathway, as represented by the arrows 324. The mobile-to-mobile setup does not use a cloud network as an intermediary and may verify and validate the data to ensure that the data sent was that same as was received by the other mobile device prior to executing on the mobile devices primary processor or to downloading onto the mobile devices primary memory.

FIG. 8C is a top view of alternate mobile devices that may utilize either the mobile-to-cloud or the mobile-to-mobile pathways as in views A and B, thereby utilizing similar contactless communication setups for secure communications. The mobile devices may exemplarily be a virtual reality display 330 and an augmented reality display 332. Additionally or alternatively, a plurality of other devices may be utilized including but not limited to a laptop computer, a tablet computer, a heads-up-display (HUD), a wearable device, a medical device tracker, a medical device, a smartwatch, a drone or unmanned aerial vehicle (UAV), a robotic device, an input device (such as a keyboard; stylus; biosensors; a motion scanner, a depth scanner, or other a gestural scanning device; and so forth) or any combination thereof.

Figure 9:
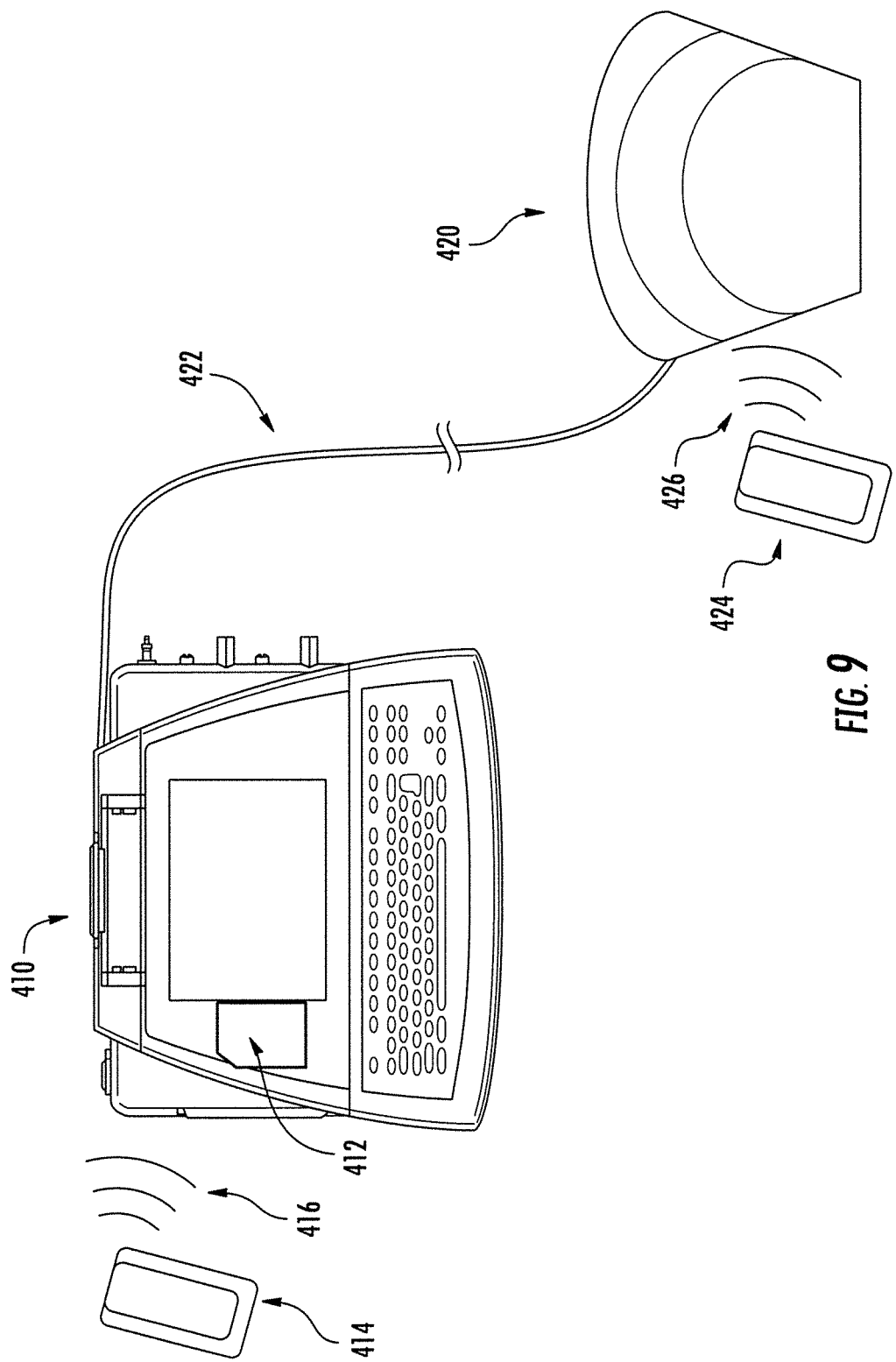
FIG. 9 shows another example of a network for securing contactless communications.

FIG. 9 shows another example of a network for securing contactless communications. An operating device 410 may contain a contactless communication device 412, which may receive a contactless communication signal 416 from a mobile device 414. The operator may send information, instructions, and/or commands to the operating device 410 from the mobile device 414 utilizing a contactless communication method.

Alternatively, a remote contactless communication device 420, which may serve as a kiosk and/or terminal, may be physically wired to the operating device 410 via a cable 422. The cable 422 may be a direct connection (like an Ethernet cable), it may be wired to a local LAN that has a physical connection to the operating device 410, or utilize an encrypted wireless communication to a cloud network intermediary or directly to the operating device 410. A mobile device 424 may communicate via a contactless communication signal 426 with the remote contactless communication device 420.

In the examples described heretofore, first data containing e.g. instructions to perform a test, may be sent from an external device to an operating device via a contactless communication setup. In some examples, an operator using the external device may only input information in a specific format, which is the only format accepted by the communication setup. For example, the first data may be entered via fillable form fields and sent as a coded locked document, where the document is read-only and the content or structure of the document cannot be changed, to the receiving device in the communication setup. The receiving device may read the coded locked document and copy and paste the data from the form fields into a program that assigns the delimiters to the data based on which row the data came from. These data may then be turned into a contactless communication package, such as an image (e.g. a visual quick response (QR) code) that is transmitted to the controlling device of the setup via a contactless communication method (such as a visual display device). The controlling device may verify that the data in the correct format, accept the package and store it. The controlling device may read the data and convert the image back into form fields' information based on the delimiters. The extracted information may be used to fill out the corresponding form fields, as if the operator typed them into the controlling device locally. After all of the fields are filled out by the controlling device, operations may be performed by the operating device, e.g. a test may be initiated. If the data received by the operating device does not fit the acceptable format then the communication with the receiving device may be halted (by disabling the contactless communication acquiring component) until the issue is diagnosed and fixed locally and/or the receiving device is reformatted to bring it back to the original state. Since the only data that may be received by the controlling device through the air gapped contactless communication setup in this embodiment is the fillable-form field data from the coded locked document where only the alphanumeric characters are sent from the receiving device to the controlling device, as if the operator was typing the characters on the actual unit, the software files from a computer virus, Trojan, or worm cannot be transferred by this method to the controlling device. No first data files from the receiving device are transferred, opened, or executed on the controlling device. The real-world equivalent would be taking a photo of a sign held up by another person across the room and inputting the characters from the photo of that sign into a computer.

FIGS. 10A-10C show examples of the formats of the data transmitted according to a method of securing contactless communications.

FIG. 10A is a view of an exemplary fillable form 400 comprising fields in which the operator may enter information, such as for the initiation of a bubble point test on an automated integrity testing process device. In one mode of the contactless communication setup, only information entered into the fillable form fields 400 may be transmitted via the contactless communication setup to the controlling device. This may provide a further security measure, because no data that are unintended or maliciously provided may alter the state of the controlling device. If e.g. the information provided is outside of an expected range, a signal may be sent to disable the receiving device. The operator may enter the information into the fillable form fields 400 on a mobile device, such as a smartphone or tablet device.

FIG. 10B shows a code 402 to transmit the fillable form fields 400, which are received by the receiving device as a locked document, where the document is read-only and the content or structure of the document cannot be changed. The code 402 may contain delimiters defining the single fields in which the information is located (e.g. test specifications, test conditions, and/or associated test data). The information from the locked document may be copied by the receiving device and processed into a contactless communication signal, such as an image.

FIG. 10C is a QR code 404 containing the information from the code 402. This information may be visually transmitted on a display device, imaged by a camera and processed by a processor located in the controlling device.

FIGS. 11A-11C show examples of visual cryptography for an added encryption layer when utilizing visual methods for contactless communications.

FIG. 11A is a view of a visual cryptographic setup 500 comprising a sending component such as a display device that displays a visual code 502, a transparent filter display device 504 and an acquiring component 512 such as a camera. Exemplarily, the sending component and the transparent filter display device 504 may be part of a first device (e.g. the receiving device) of a contactless communication setup, and the acquiring component 512 may be part of a second device (e.g. the controlling device) of the contactless communication setup. In another example, the transparent filter display device 504 may be part of the second device or be a component altogether.

The visual code 502, such as a visually coded QR code, cannot be coherently read in its current state by the camera 512. Selected sequences and/or portions of the data must be removed for the visual code to be coherently readable by the camera 512. Positioned between the sending display device displaying the visually coded QR code 502 and the receiving camera 512 is the transparent filter display device 504, which may block portions of the coded QR code 502 to remove those selected portions from the visual code 502 and make it readable by the camera 512. The transparent filter display device 504 is a see-through display that can alter the opaque sections and may be a transparent OLED, transparent LCD, electroluminescent, e-ink, transparent resonant nanoparticle scattering display, Quantum dot display, thin film electroluminescent (TFEL) display, prism display, projection display, or a fluid filled matrix display (where an opaque liquid fills and drains from a pocket in a grid configuration). The transparent filter display device 504 may consist of transparent sections 506, which allow the corresponding portions of the visual code 502 to be seen through, and opaque sections 508, which do not allow the corresponding portions to be detected by the camera 512 downstream of the transparent filter display device 504. With the correct configuration of the blocking opaque sections 508 of the transparent filter display device 504, the visual code can be coherently read by the camera 512 and may be interpreted by the processor (not shown) of that portion of the contactless communication setup (e.g. the controlling device). The correct configuration of the blocking opaque sections 508 to be overlaid on the visual code 502 may be previously provided by the sending display device as a variable augmented reality marker frame, which instructs the transparent filter display device 504 to utilize a particular configuration out of a large plurality of selections. Alternatively, the correct configuration of the blocking opaque sections 508 to be overlaid on the visual code 502 may be provided within a subsection of the current visual code 502, such as the upper left portion of the code 502. Alternatively, the correct configuration of the blocking sequence may be determined by an external event such as time or the transparent filter display device 504 may sequence through a plurality of different configurations each time a visual code 502 is presented depending on the frame rate of the sending display device and the frame rate of the transparent filter display device 504.

FIG. 11B is a view of a visual cryptographic setup 520 similar to the visual cryptographic setup 500, i.e. which may comprise the same components of setup 500, where a data sequence, image, or visual code 522 is digitally split into two or more visual components which are unreadable separately but are readable when the transparent images are overlaid one on top of the other. The device of the contactless communication setup that includes the sending display device (e.g. the receiving device) may digitally split the received data and/or visual codes into at least two separate visually-encrypted parts. The first visually-encrypted part 526 is transferred from the sending display device to the camera 530, i.e. through the visual contactless communication setup. This first visually-encrypted part 526 may be displayed on the transparent filter display device. The second visually-encrypted part 524 may be displayed on the sending display device. The camera 530 then views the overlay of the first-encrypted part 526 on the transparent filter display device with the second visually-encrypted part 524 on the sending display device and can read the combined visually-coded message 528 from both parts. A plurality of transparent filter screen display devices may be utilized and the visual code may be split into a corresponding plurality of images.

FIG. 11C is a view of a visual cryptographic setup 540 similar to the visual cryptographic setup 500, i.e. which may comprise the same components of setup 500, where a data sequence, image, or visual code 542 is digitally split into two or more visual components which are unreadable separately but are readable when the transparent images are overlaid one on top of the other. The device of the contactless communication setup that includes the sending display device (e.g. the receiving device) may digitally split the received data and/or visual codes into at least two separate visually-encrypted parts. The first visually-encrypted part 550 may be transferred from the sending display device to the camera 546, i.e. through the visual contactless communication setup. This first visually-encrypted part 550 may be stored in the memory of the device of the contactless communication setup that includes the camera (not shown). The secondary visually-encrypted part 544 may also be displayed on the sending display device. The second visually-encrypted part 544 may also be stored in the memory of the device of the contactless communication setup that includes the camera (not shown). The processing device 548 of this device (not shown) then may digitally overlay the two images together and read the combined visually-coded message 552 from both parts. The initial visual code 542 may be split into a corresponding plurality of encrypted images. The contactless communication setup may take advantage of the unidirectional network by sending through the network several encrypted visual codes that do not match the first visually-encrypted part 550 or the second visually-encrypted part 544. The data from the successfully-matching visually-encrypted codes may be read and transmitted through the contactless communication setup while the other falsely matching visually encrypted codes may be deleted.

What is claimed is:
1. A network for securing contactless communications, the network comprising:
   a first device;
   a receiving device configured to receive first data from the first device;
   an operating device for performing at least one of production and testing operations;
   a controlling device operationally coupled to the operating device;
   a unidirectional network configured to allow communication of the first data from the receiving device to the controlling device;
   a processing device;
   at least one networking device: and
   a transmitting device, wherein:
   the controlling device is configured to control the at least one of production and testing operations performed by the operating device on the basis of the first data and to communicate second data resulting from the at least one of production and testing operations to the transmitting device;
   the transmitting device is configured to transmit the second data to the processing device via the at least one network device and the processing device is configured to process the second data and to send the processed second data to the first device via the at least one network device;
   the receiving device further is configured to communicate the first data to the transmitting device;
   the transmitting device is configured to transmit the first data to the processing device via the at least one network device;
   the processing device is configured to verify the authenticity of the first data; and
   if the authenticity of the first data is verified, the processing device further is configured to send an authorization signal to the receiving device for communicating the first data to the controlling device; whereas if the authenticity of the first data is not verified, the processing device is further configured to send a halting signal to the receiving device for ceasing communications.

2. The network of claim 1, wherein:
the transmitting device is configured to transmit the second data to the first device.

3. The network of claim 2, further comprising a second unidirectional network configured to allow communication of the second data from the controlling device to the transmitting device.

4. The network of claim 3, wherein the unidirectional network, the second unidirectional network, the receiving device, the controlling device and the transmitting device are at least partially enclosed within a Faraday cage.

5. The network of claim 1, wherein the operating device is at least one of an integrity testing device, a container controlling unit, a single-use assembly controlling unit, a pump, a valve, a tank, a mixing device, a purification device, a centrifugation device, a bioreactor, a fermentation equipment, a 3D printer, an incubator, an electronic scale, a bioprocess device, a laboratory device, a medical device and a combination thereof.

6. The network of claim 1, wherein the receiving device comprises a short-range communication device for communicating the first data.

7. The network of claim 6, wherein the short-range communication device comprises at least one of a display screen, an RFID transmitter, an NFC transmitter, an ultrasound transmitter, a speaker, a laser projector and an infrared LED.

8. The network of claim 6, wherein the controlling device comprises a short-range communication device for acquiring the first data.

9. The network of claim 8, wherein the short-range communication device comprises at least one of a camera, an infrared camera, a photodiode, an RFID receiver, an NFC receiver, an ultrasound receiver, a microphone and a laser photodetector.

10. The network of claim 1, wherein the processing device comprises at least one of a database and a cloud computing server.

11. A computer-implemented method of securing contactless communications exchanged between a first device and an operating device for performing at least one of production and testing operations, the method comprising:
operatively coupling the operating device to a controlling device;
providing a unidirectional network between the controlling device and a receiving device;
receiving, by the receiving device, first data from the first device;
using the unidirectional network to communicate the first data from the receiving device to the controlling device;
controlling, by the controlling device, the at least one of production and testing operations performed by the operating device on the basis of the first data, wherein:
the first data are input in the first device by an operator through a fillable form;
the first data are received by the receiving device as a locked document;
the first data, as the locked document, are copied and processed by the receiving device into an image.

12. The method of claim 11, further comprising:
communicating, by the controlling device, second data resulting from the at least one of production and testing operations to a transmitting device; and
transmitting, by the transmitting device, the second data to the first device.

13. The method of claim 12, wherein communicating, by the controlling device, second data to the transmitting device comprises using a unidirectional network.

14. The method of claim 12, wherein transmitting the second data to the first device comprises:
transmitting, by the transmitting device, the second data to a processing system via a network device;
processing, by the processing system, the second data;
sending, by the processing system, the processed second data to the first device via the network device.

15. A computer-implemented method of securing contactless communications exchanged between a first device and an operating device for performing at least one of production and testing operations, the method comprising:
operatively coupling the operating device to a controlling device;
providing a unidirectional network between the controlling device and a receiving device;
receiving, by the receiving device, first data from the first device;
communicating, by the receiving device, the first data to a transmitting device;
transmitting, by the transmitting device, the first data to a processing system;
verifying, by the processing system, the authenticity of the first data; and
if the authenticity of the first data is verified, sending, by the processing system, an authorization signal to the receiving device for communicating the first data to the controlling device and then using the unidirectional network to communicate the first data from the receiving device to the controlling device and controlling, by the controlling device, the at least one of production and testing operations performed by the operating device on the basis of the first data; whereas
if the authenticity of the first data is not verified, sending, by the processing system, a halting signal to the receiving device for ceasing communications.

16. The method of claim 15, wherein:
the first data are input by an operator in the first device through a fillable form;
the first data are received by the receiving device as a locked document;
the first data as the locked document are copied and processed by the receiving device into an image.

17. The method of claim 15, wherein the processing system comprises at least one of a database and a cloud computing server.

18. The method of claim 17, wherein verifying the authenticity of the first data comprises comparing the first data with data previously stored in the at least one of the database and the cloud computing server and the authenticity of the first data is verified when the first data matches the previously stored data.

* * * * *